Dec. 30, 1930.  O. DUDA  1,786,484
REAMER
Filed April 2, 1927

INVENTOR.
Osmald Duda
BY
Vincent Martin
ATTORNEYS.

Patented Dec. 30, 1930

1,786,484

UNITED STATES PATENT OFFICE

OSWALD DUDA, OF HOUSTON, TEXAS, ASSIGNOR TO REED ROLLER BIT COMPANY, OF HOUSTON, TEXAS, A CORPORATION OF TEXAS

REAMER

Application filed April 2, 1927. Serial No. 180,577.

This invention relates to well drilling devices, and more particularly to reamers.

It has for its object the provision of a new and improved reamer embodying reaming cutters and means to move them from inoperative to operative position, and to yieldably hold them in operative position.

Figure 1:
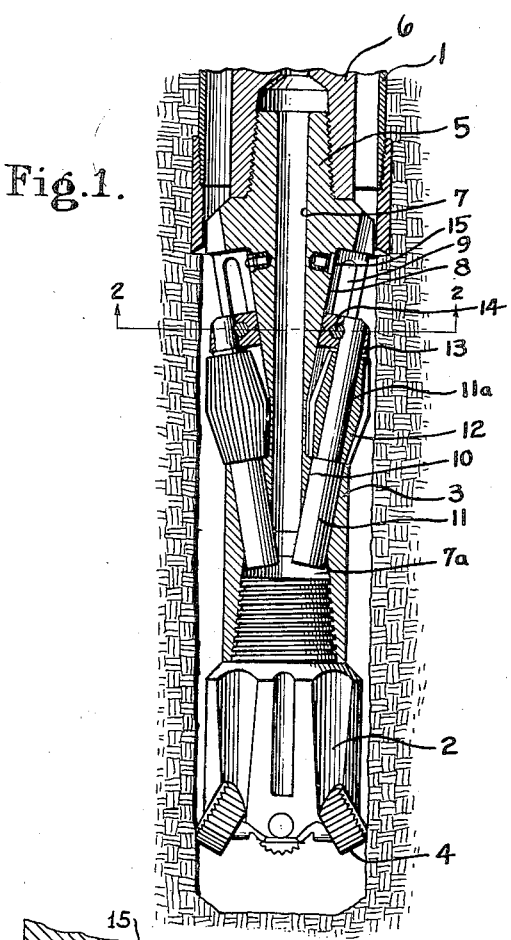
Figure 3:
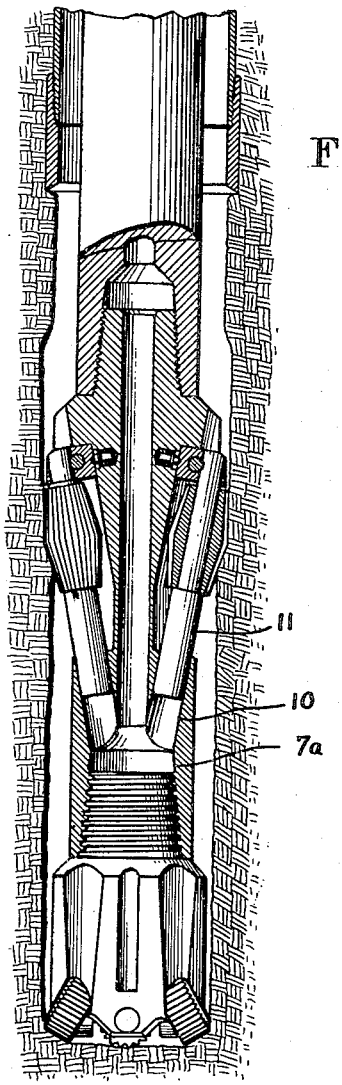
Figure 4:
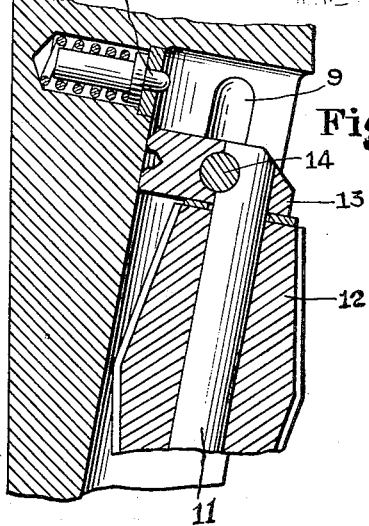
Figure 2:
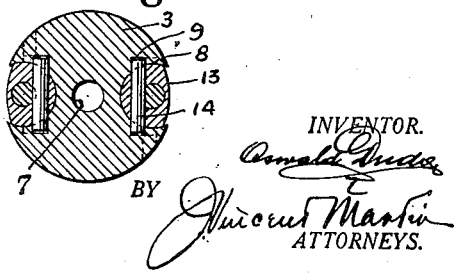

Various other objects will appear in the following description:

In the drawings, illustrative of the preferred embodiment of the invention, Fig. 1 is a sectional elevation showing the reamers in contracted and inoperative position, emerging from the casing. Fig. 2 is a sectional detail taken on the line 2—2 of Fig. 1. Fig. 3 is a sectional elevation similar to Fig. 1, illustrating the reamers in expanded and operative position. And Fig. 4 is a detailed view illustrating the releasable catch mechanism.

A casing, such as is ordinarily used in water and oil well drilling, is shown in the drawings at 1. This casing is of a diameter to receive bit head 2 and a reamer head or section 3. Bit head 2, as shown, has mounted therein a plurality of roller cutters 4. The roller cutters 4, however, are shown only for the purpose of rendering the illustration of the invention complete, and form no part of the invention. A bit head carrying disc or any other type of cutters could as well be used, or the use of the head omitted.

Head 2 has a shank threaded into section 3, section 3 in turn having a shank 5 threaded into pipe 6.

Reamer head or section 3 has a central water course 7 and a chamber 7a to which said course leads.

A plurality of longitudinal and downwardly and inwardly inclined recesses 8 are formed in the outer sides of section 3, the wall of said recesses forming more than a semicircle but less than a circle (as shown in Fig. 2), and having grooves 9 therein extending longitudinally thereof. A plurality of bores 10 lead from recesses 8 to chamber 7a extending in a direction substantially parallel to grooves 9. Bores 10 are adapted to receive the lower ends of reamer pins 11, pins 11 being slidable therein. The upper parts of pins 11 are reduced, as shown at 11a, and have rotatably mounted thereon reaming rollers 12.

It is to be noted here that reaming rollers 12 have oppositely beveled toothed surfaces.

The lower beveled toothed surface will, of course, do most of the cutting, and, therefore, will sustain the greatest wear. When the teeth of this surface have become worn, the reamer cutter may be taken from the section and remounted in the section upside down. The upper beveled toothed surface, comparatively sharp, will then be on the bottom, and will perform the cutting function theretofore performed by the other beveled toothed surface.

The upper reduced end 11a of pin 11 carries a crosshead 13. A pin 14 passes through said crosshead at right angles to pin 11 and rests in a notch in reduced part 11a of pin 11, as shown, thereby to lock pin 11 in crosshead 13 against rotary and longitudinal movement with respect to said crosshead.

Pin 14 extends from each side of crosshead 13 into grooves 9, and is slidable up and down in said grooves.

In the uppermost part of recess 8, is seated a spring-pressed plunger 15. Crosshead 14 has in its innermost face a shallow hole to receive the end of said plunger.

The foregoing description of one of the reamers and the parts cooperating therewith is equally descriptive of all. The drawings illustrate two reamers mounted on diametrically opposite sides of the reamer section. It is to be understood that only one reamer might be used, or any number, and said reamers may be placed in any position, with respect to each other, that might be found best under certain conditions.

The invention will be found particularly useful in underreaming a hole below a casing.

The use and operation of the invention may be described as follows:

With reamer cutter pins 11 in their lowermost, or contracted and inoperative position, the device is lowered through casing 1. The force of gravity normally holds said pins in such position. See Fig. 1.

The parts having emerged from the bottom of casing 1, slush is pumped through the pipe 6 and course 7 into chamber 7a. The water thus forced downwardly will ultimately escape through head 2, and in its passage clean rollers 4. But, meanwhile, because of its head and the force of the pump, it is under pressure in chamber 7a and will force pins 11 upwardly and outwardly to carry the reamers into their operative position. In their movement upwardly in grooves 8, crossheads 13, carried by pins 11, will force plungers 15 inwardly, overcoming the pressure of the springs thereof, and when the crossheads strike the upper end walls of recesses 8, the springs of plungers 15 will force the plungers into the holes of the crossheads, to releasably hold said crossheads in their uppermost positions. See Fig. 3.

The parts are then rotated in the usual manner, and the engagement of the lower beveled, toothed surfaces of reamers 12 with the wall of the hole will serve to firmly hold the reamers in their uppermost, and therefore outermost and operative position.

The underreaming operation having been performed, the parts are raised. Plungers 15 have a sufficiently firm hold in crossheads 13 to support the weights of the cutters, pins and crossheads, but little more. The reamers, therefore, remain in their operative position until the upper ends of pins 11 strike the lower end of casing 1, whereby the temporary lock afforded by the plungers is broken, the plungers riding up and out of the holes in the crosshead and against the pressures of the springs. The reamers then drop to their lowermost, and therefore innermost and inoperative position where they are held by gravity. The parts may then be removed through the casing.

The reamers may then be remounted upside down and the parts again lowered in the hole, for a repetition of the above described operation.

While the invention is particularly useful in deep well drilling apparatus, it may also be used in pipe and tube cleaning, and the like.

While the preferred embodiment and use of the invention have been illustrated and described, the invention is limited neither to such particular use or specific form, and various changes may be made without departure from the scope of the hereinafter appearing claims.

I claim:

1. In deep well drilling apparatus, a head having pin guides, a pin slidable in said guides, a cutter carried by said pin, a crosshead carried by said pin, and a spring-pressed plunger mounted in said head, said plunger engaging said crosshead, to releasably lock the same in a predetermined position.

2. In deep well drilling apparatus, a head having grooves therein, a pin carrying a cutter slidably in said head, a crosshead having one bore to receive said pin and another bore, another pin fitting in the last-mentioned bore, locking the first-mentioned pin in the crosshead, and extending outwardly from said crosshead into the grooves in the head.

3. In deep well drilling apparatus, a head having a spring pressed plunger mounted therein, a cutter carrying pin slidable in said head, a cutter carried by said pin, a crosshead carried by said pin and having a shallow hole therein, said spring pressed plunger entering said hole when the crosshead is in a predetermined position, to releasably lock said crosshead in said position.

4. In deep well drilling apparatus, a head, reamers having oppositely beveled toothed surfaces, means to mount said reamers in said head slidably upwardly and outwardly and inwardly and downwardly, in said head, fluid pressure means to move said reamers into their uppermost and outermost position, and means to releasably lock said reamers in said position.

5. In deep well drilling apparatus, a head having a central fluid chamber and a bore leading upwardly and outwardly from said chamber, a cutter pin slidable in said bore, a cutter carried and movable by said pin from an inoperative position into an operative position, fluid pressure means to actuate said pin, a crosshead carried by said pin, and a spring-pressed plunger mounted in said head to engage and releasably lock said crosshead against movement to hold said cutter in its operative position.

6. In deep well drilling apparatus, a head having a central fluid chamber, a bore leading upwardly and outwardly from said chamber, a cutter pin slidable in said bore, a cutter carried by said pin, fluid pressure means to move said pin upwardly and outwardly in said bore to carry said cutter into its uppermost and outermost position and means to releasably lock said cutter in said position.

OSWALD DUDA.